(12) United States Patent  
Johansen

(10) Patent No.: US 11,796,045 B2  
(45) Date of Patent: Oct. 24, 2023

(54) STRAIN WAVE GEAR WITH ENCODER INTEGRATION

(71) Applicant: Universal Robots A/S, Odense S. (DK)

(72) Inventor: Steffen Henrik Johansen, Odense S. (DK)

(73) Assignee: Universal Robots A/S, Odense S (DK)

( * ) Notice: Subject to any disclaimer, the term of this patent is extended or adjusted under 35 U.S.C. 154(b) by 0 days.

(21) Appl. No.: 17/553,110

(22) Filed: Dec. 16, 2021

(65) Prior Publication Data

US 2022/0307581 A1    Sep. 29, 2022

(51) Int. Cl.
| | |
|---|---|
| *F16H 49/00* | (2006.01) |
| *B25J 9/10* | (2006.01) |
| *B25J 13/08* | (2006.01) |

(52) U.S. Cl.
CPC ............ *F16H 49/001* (2013.01); *B25J 9/108* (2013.01); *B25J 9/1025* (2013.01); *B25J 13/088* (2013.01)

(58) Field of Classification Search
CPC ...... F16H 49/001; B25J 9/1025; B25J 13/088
See application file for complete search history.

(56) References Cited

U.S. PATENT DOCUMENTS

| | | |
|---|---|---|
| 5,178,031 A | 1/1993 | Orsi et al. |
| 5,775,178 A | 7/1998 | Asawa et al. |
| 5,906,142 A | 5/1999 | Shirasawa |
| 6,530,457 B1 | 3/2003 | Nago et al. |
| 8,991,282 B2 | 3/2015 | Yajima et al. |
| 2005/0235774 A1 | 10/2005 | Tanioka et al. |
| 2007/0110554 A1 | 5/2007 | Ono |
| 2008/0315728 A1 | 12/2008 | Liu et al. |
| 2014/0157925 A1 | 6/2014 | Yajima et al. |
| 2016/0305527 A1 | 10/2016 | Chuo et al. |
| 2017/0051817 A1 | 2/2017 | Maruyama |

(Continued)

FOREIGN PATENT DOCUMENTS

| | | |
|---|---|---|
| CN | 101371105 A | 2/2009 |
| CN | 103987994 A | 8/2014 |

(Continued)

OTHER PUBLICATIONS

Intention to Grant and Search Report for Danish Patent Application No. PA202170142, dated Sep. 13, 2001, 11 pages.

(Continued)

*Primary Examiner* — William C Joyce
(74) *Attorney, Agent, or Firm* — Burns & Levinson LLP

(57) ABSTRACT

A strain wave gear includes gear elements including a circular element having an internally-toothed gear and a flex element having a flexible externally-toothed gear arranged in the circular element. A wave generator is rotatably arranged in the flex element and configured to flex the externally-toothed gear in a radial direction to partly mesh the internally-toothed gear and the externally-toothed gear. Support elements include a bearing input support element and a bearing output support element rotatably coupled to the bearing input support element. Elements of the support elements are fixed respectively to elements of the gear elements. An encoder arrangement includes an encoder track and an encoder reader. A part of the encoder arrangement is between an element of the support elements and an element of the gear elements.

21 Claims, 6 Drawing Sheets

(56) References Cited

U.S. PATENT DOCUMENTS

| | | |
|---|---|---|
| 2017/0222517 A1 | 8/2017 | Kobayashi |
| 2017/0237315 A1 | 8/2017 | Hirokawa et al. |
| 2017/0338718 A1 | 11/2017 | Terashima et al. |
| 2020/0298423 A1 | 9/2020 | Ayuzawa |
| 2020/0340569 A1 | 10/2020 | Johansen |
| 2021/0041846 A1 | 2/2021 | Horiguchi |
| 2022/0307581 A1 | 9/2022 | Johansen et al. |

FOREIGN PATENT DOCUMENTS

| | | | |
|---|---|---|---|
| EP | 0112891 A1 | | 7/1984 |
| JP | 2009050641 A | | 3/2009 |
| KR | 20170053499 A | | 5/2017 |
| WO | WO 2007/082954 A1 | * | 7/2007 |
| WO | 2012042562 A1 | | 4/2012 |
| WO | 2014091522 A1 | | 6/2014 |
| WO | 2016049622 A1 | | 3/2016 |
| WO | 2017012626 A1 | | 1/2017 |
| WO | 2017148499 A1 | | 9/2017 |
| WO | WO 2017/203753 | * | 11/2017 |
| WO | 2018130447 A1 | | 7/2018 |
| WO | 2018157910 A1 | | 9/2018 |
| WO | 2019096923 A2 | | 5/2019 |
| WO | WO 2019/096923 | * | 5/2019 |
| WO | 2019219886 A1 | | 11/2019 |

OTHER PUBLICATIONS

International Search Report for International Patent Application No. PCT/EP2019/062750, dated Jan. 24, 2020, 6 pages.
Written Opinion for International Patent Application No. PCT/EP2019/062750, dated Jan. 24, 2020, 9 pages.
Extended European Search Report for European Patent Application No. 21216445.3, dated May 13, 2022, 12 pages.
First Office Action in Chinese Application No. 201880071930.2 dated Feb. 7, 2023 (with English summary), 18 pages.
Notice of Reasons for Rejection for Japanese Patent Application No. 2020-526139, dated Nov. 1, 2022, (with English translation) (9 pages).
International Search Report for International Patent Application No. PCT/EP2018/081413, dated May 23, 2019, (6 pages).
Written Opinion for International Patent Application No. PCT/EP2018/081413, dated May 23. 2019. (12 pages).
International Preliminary Report on Patentability for International Patent Application No. PCT/EP2018/081413, dated May 19, 2019. (13 pages).
Decision of Final Rejection for Korean Patent Application No. 10-2020-7012475, dated Jun. 21, 2022, (with English translation) (6 pages).
Notice of Grounds for Rejection for Korean Patent Application No. 10-2020-7012475, dated Nov. 18, 2021, (9 pages), (with English translation).
Communication pursuant to Article 94(3) EPC for European Patent Application No. 18812073.7, dated Feb. 7, 2022. (7 pages).

* cited by examiner

STRAIN WAVE GEAR WITH ENCODER INTEGRATION

CROSS-REFERENCE TO RELATED APPLICATION

This application claims priority to Denmark Patent Application No. PA202170142, which was filed on Mar. 25, 2021 and titled "Strain Wave Gear With Encoder Integration". The contents of Denmark Patent Application No. PA202170142 are incorporated herein by reference.

TECHNICAL FIELD

This application relates to example implementations of a strain wave gear, to a robot joint, and a to a method for assembling a strain wave gear. This application further relates to a robot arm with a strain wave gear and use of elements of a strain wave gear.

BACKGROUND

In the field of robotics, where a robot arm includes a number of robot joints connecting different parts of the robot arm and where a joint motor is configured to move the parts in relation to each other, it is known to use strain wave gears as a transmission system between the joint motor and the movable part, as the strain wave gears transmits large forces without backlash.

Strain wave gears are used in a variety of applications such as CNC-machines, robotics, satellites, solar tracking, etc. They are very precise with little or no backlash, and therefore often preferred in applications where high precision and accuracy of the output is needed. In these applications a feedback system is often used such as an electronic encoder connected to control electronics that run an electric motor driving the input side of the strain wave gear.

Encoders typically rely in an encoder track and an encoder reader, which is capable of reading the relative orientation of the track. By attaching reader and track on input and output, respectively, it is thus possible to monitor the rotation of the gear.

In some strain wave gears, an encoder is typically attached externally on/near the gear or in a housing/cabinet holding the strain wave gear. The attachment of the encoder track and reader may not be as accurate and precise as desired for strain wave gears. For example, strain on the track may shift it slightly away from a desired location. Further, such attachment and adjustment of the track or the reader as one or more separate operations may result in increased assembly time.

SUMMARY

Implementation of the example strain wave gear and variants thereof described herein may have a relatively precise encoder arrangement.

An example strain wave gear includes:
  gear elements, where the gear elements include a circular element with an internally toothed gear and where the gear elements include a flex element with a flexible externally toothed gear arranged in the circular element;
  a wave generator rotatably arranged in the flex element and configured to flex the externally toothed gear in a radial direction to partly mesh the internally toothed gear and the externally toothed gear;
  support elements, where the support elements include a bearing input support element and a bearing output support element rotatably coupled to the bearing input support element, where elements of the support elements are fixed respectively to elements of the gear elements; and
  an encoder arrangement that includes an encoder track and an encoder reader, where a part of the encoder arrangement is fastened between an element of the support elements and an element of the gear elements.

Gear elements and support elements are typically manufactured according to precise and accurate standards to permit a well-functioning strain wave gear. For example, particular dimensions of these elements, such as a particular length or diameter, typically have to lie within a narrow tolerance range. By fastening a part of the encoder arrangement between a support element and a gear element, the precision and accuracy of gear elements and/or support elements may be inherited to the encoder arrangement, which is advantageous. For example, the encoder track may be fastened between the circular element and the bearing output support element, which in turn are attached to each other. Consequently, the encoder track may acquire at least a part of the precision and; or accuracy of the circular element and/or the bearing output support element.

Further, by fastening a part of the encoder arrangement between two elements, the fastened part of the encoder arrangement is maintained in a planar arrangement, which is advantageous. In other words, the risk of twisting, wobbling, or swaying the encoder arrangement away from its intended position may be reduced, which is advantageous.

Further, by fastening a part of the encoder arrangement between two elements, the assembling procedure of the strain wave gear may become more efficient, which is advantageous. For example, separate means for attaching a part of the encoder arrangement may not be required.

Further, since localization of the encoder arrangement may be improved and wobbling effects may be reduced, the example strain wave gear may potentially allow the distance between the encoder reader and the encoder track to be reduced, which is advantageous since this may increase accuracy and precision of the measurements provided by the encoder arrangement.

Further, the integration of a part of the encoder arrangement between two elements of the strain wave gear may permit a more compact strain wave gear, which is advantageous.

Further, the integration of the encoder arrangement between elements, may permit at least a part of the encoder arrangement to be located closer to the gear elements. Thus, measurements by the encoder arrangement may permit a more accurate representation of the relative orientation of the gear elements, which is advantageous.

Further, by utilizing elements of the strain wave gear for fastening a part of the encoder track, fewer parts may be required for assembly, which is advantageous.

Further, by fastening a part of the encoder arrangement between elements of the strain wave gear, it may be possible to utilize larger encoder tracks without dislocating the track undesirably, which is advantageous. In addition, larger encoder tracks may also have a better positional resolution which improves the accuracy of the encoder arrangement, which is advantageous.

Further, the risk of parts of the encoder arrangement becoming loose during operation may be reduced, which is advantageous.

The encoder reader, the encoder track, or both the reader and the track may be fastened between elements in this manner to potentially ensure increased accuracy and precision, and to potentially decrease wobbling effects. Typically, the encoder track is circular and may thus be more straightforward to fasten. The encoder reader may for example be located on a printed circuit board (PCB), which in turn may or may not be circular. In implementations where a part of the encoder reader and the PCB is fastened between two elements, the elements may for example be manufactured with a groove for receiving the PCB, where the groove has an extend which matches the extend of the PCB, e.g., it may not extend all the way around a central axis of the strain wave gear. In implementations where a part of the encoder track is fastened, between two elements, the elements may similarly be manufactured with a groove for receiving the encoder track. Here, there groove may typically extend all the way around a central axis of the strain wave gear since the encoder track extends all the way around the central axis.

That a part of the encoder arrangement is fastened between an element of the support elements and an element of the gear elements, may for example also be understood as the part being clamped between, being fixed between, or being attached between these elements. Typically, the elements which the encoder arrangements are fastened between may be fixed to each other, for example by fastening means. Such fastening means may for example include threads, screws, clamps, press fit, glue, welding etc. Thus, a part of the encoder arrangement may be fastened between two elements as a consequence of the two elements being fastened to each other through fastening means. However, note that the example strain wave gear is not limited to particular fastening structure or having fastening structure as such. Further, the example strain wave gear is not limited to any particular approaches of fastening a part of the encoder arrangement. Fastening structures may also be understood as one or more fasteners.

The fastening of the encoder reader and/or the encoder track may typically result in the encoder reader and/or the encoder track being approximately planar in one or more planes perpendicular to a central axis of the strain wave gear. Accordingly, the encoder track may typically be arranged rotationally symmetrically relative to the central axis. The central axis may for example be the axis around which the wave generator rotates to drive the gear. The central axis may for example be the axis around which the bearing input support element and the bearing output support elements are rotationally coupled. The central axis may for example be the axis around which the gear elements are arranged around.

The encoder arrangement may also include various extensions, flanges, protruding parts, etc. For example, these may be used for fastening or attachment. For example, an encoder track may have a radial inward or radial outward extension which an element of the bearing support and an element of the gear elements clamps to fasten the encoder track.

Generally, a strain wave gear may also be referred to as strain wave gearing or harmonic gearing. The wave generator may typically have an elliptical shape, arranged to deform the flex element slightly to partly mesh the internally and externally toother gears. The flex element typically has slightly fewer gear teeth than the circular element, but in principle, the ratio of numbers of gear teeth of the two elements is in principle not limited to a particular ratio, and in various implementations the ratio could either be more or less than 1. Upon rotation of the wave generator, one or more meshing positions of the gears move in a circumferential direction, causing the gear elements to rotate in relation with each other. Similarly, the bearing input support element and the bearing output support element may be caused to rotate in relation with each other.

An encoder arrangement may ensure tracking of the relative orientation between the gear elements or, equivalently, the relative orientation between the hearing input and bearing output support elements. When the wave generator is rotated to drive the gear, the encoder track may be rotated relatively to the encoder reader, and the encoder reader may then read/measure the movement of the track and provide an output accordingly.

A gear element may be understood as an element, member, body, or component with gears for transmitting rotational motion from the input to the output of the strain wave gear. The flex element may also be understood as a flex spline. The circular element or a part of the circular element may also be understood as a circular spline.

The support elements include the bearing input support elements and the hearing output support elements. These may typically support an internal bearing, or races of an internal bearing. More generally, a support element may be understood as element, member, body, or component for supporting the transmission of rotational motion from the input to the output of the gear, e.g., through bearings, spacers, housing, and input/output elements. Input and output elements may for example be flanges, shafts, or discs. Support elements may typically be arranged partly or fully around a central axis of the strain wave gear but are not restricted to any particular geometry.

According to implementations of the example strain wave gear, elements of the support elements are fixed respectively to elements of the gear elements. This may also be understood as individual/separate elements of the support elements being fixed respectively to individual/separate elements of the gear elements. For example, a first element of the support elements is fixed to a first element of the gear elements, and a second element of the support elements is fixed to a second element of the gear elements. For example, the bearing input support element is fixed to the circular element while the bearing output support element is fixed to the flex element, or the hearing output support element is fixed to the circular element while the bearing input support element is fixed to the flex element.

The bearing input support element may be fixed to the input of the strain wave gear, and the bearing output support element may be fixed to the output of the strain wave gear.

In some implementations of the example strain wave gear, the bearing input support element and the bearing output support element may respectively be an outer bearing support element and an inner bearing support element, or vice versa.

In an implementation of the example strain wave gear, the externally toothed gear and the internally toothed gear are meshed at a meshing position, where rotation of the wave generator moves the meshing position in a circumferential direction to cause relative rotation between the circular element and the flex element.

In some implementations of the example strain wave gear, the externally toothed gear and the internally toothed gear are meshed at multiple meshing positions which moves upon rotation of the wave generator. For example, two meshing positions or more than two meshing positions.

In an implementation of the example strain wave gear, an input shaft is configured to rotate the wave generator inside the flex element.

An input shaft may be utilized to facilitate transmission of rotation, e.g., from a driving motor, which is advantageous.

In an implementation of the example strain wave gear, the input shaft is rotatably supported by the circular element via at least one shaft bearing.

In an implementation of the example strain wave gear, the input shaft is rotatably supported by the bearing input support element via at least one shaft bearing.

In an implementation of the example strain wave gear, the input shaft is rotatably supported by an end plate element via at least one shaft bearing.

Having one or more shaft bearings ensures stable transmission of rotations, which is advantageous.

An end plate may be understood as an element located in one end of the strain wave fear for enclosing the strain wave gear. It may for example support a bearing, gaskets, have screw holes, for example for also attaching other elements to the strain wave gear.

In an implementation of the example strain wave gear, the end plate is an element of the support elements, where a part of the encoder arrangement is fastened between the end plate and an element of the gear elements.

In an implementation of the example strain wave gear, a part of the encoder arrangement is fastened together with a spacer element between an element of the support elements and an element of the gear elements.

In an implementation of the example strain wave gear, one or more spacer elements between an element of the support elements and an element of the gear elements may allow more flexibility as to how the support elements and the gear elements are arranged relatively to each other, which is advantageous.

In an implementation of the example strain wave gear, a part of the encoder arrangement is clamped between an element of the support elements and an element of the gear elements.

In an implementation of the example strain wave gear, a part of the encoder arrangement is fixed between an element of the support elements and an element of the gear elements.

In an implementation of the example strain wave gear, a part of the encoder arrangement is attached between an element of the support elements and an element of the gear elements.

Clamping, fixing, or attaching a part of the encoder arrangement between an element of the support elements and an element of the gear elements may potentially improve stability of the fastened encoder arrangement, which is advantageous. The part may for example be the encoder track or the encoder reader.

In an implementation of the example strain wave gear, a part of the encoder arrangement is in direct contact with an element of the support elements.

In an implementation of the example strain wave gear, a part of the encoder arrangement is in direct contact with an element of the gear elements.

In an implementation of the example strain wave gear, a part of the encoder arrangement is in direct contact with an element of the support elements and an element of the gear elements.

By having direct contact, the precision and accuracy of support elements and/or gear elements may be transferred more effectively to a part of the encoder arrangement, which is advantageous. The direct contact may be with the elements which fasten the encoder arrangement. In various implementations, the encoder track is in direct contact.

In various implementations, the encoder reader is in direct contact. In other implementations, one or more parts of the encoder arrangement is not in direct contact with elements of the support elements and/or elements of the gear elements.

In an implementation of the example strain wave gear, the flex element is fixed to the bearing output support element.

In an implementation of the example strain wave gear, the flex element is fixed to the bearing input support element.

In an implementation of the example strain wave gear, the circular element is fixed to the bearing output support element.

In an implementation of the example strain wave gear, the circular element is fixed to the bearing input support element.

In an implementation of the example strain wave gear, the encoder track is fixed to the bearing output support element and the encoder reader is fixed to the bearing input support element.

In an implementation of the example strain wave gear, the encoder track is fixed to the bearing input support element and the encoder reader is fixed to the hearing output support element.

The encoder track and the encoder reader being fixed to respective support elements may be understood as the encoder track and the encoder reader following the relative rotational movement of the elements that they are fixed to. The encoder reader and encoder track are thus not necessarily in direct contact with the support elements they are fixed to.

In an implementation of the example strain wave gear, the encoder arrangement measures relative rotation between the circular element and the flex element.

In an implementation of the example strain wave gear, the encoder arrangement measures relative rotation between the bearing input support element and the bearing output support element.

Measuring relative rotation permits improved control, which is advantageous.

In an implementation of the example strain wave gear, the encoder arrangement is located inside the strain wave gear.

By localizing the encoder arrangement inside the strain wave gear, it is protected from damage from external sources which is advantageous.

In an implementation of the example strain wave gear, the encoder track is fastened between the circular element and the bearing input support element.

In an implementation of the example strain wave gear, the encoder track is fastened between the circular element and the bearing output support element.

By fastening the encoder track between the circular element and the bearing output support element, the example strain wave gear may be implemented in existing designs of strain wave gears with minimal changes to these designs, which is advantageous. More generally, arranging a part of the encoder arrangement between two elements which are fixed to each other according to existing designs is advantageous.

In an implementation of the example strain wave gear, the encoder track is fastened between the flex element and the bearing input support element.

In an implementation of the example strain wave gear, the encoder track is fastened between the flex element and the bearing output support element.

In an implementation of the example strain wave gear, the encoder reader is fastened between the circular element and the bearing input support element.

In an implementation of the example strain wave gear, the encoder reader is fastened between the circular element and the bearing output support element.

In an implementation of the example strain wave gear, the encoder reader is fastened between the flex element and the bearing input support element.

In an implementation of the example strain wave gear, the encoder reader is fastened between the flex element and the bearing output support element.

In an implementation of the example strain wave gear, the encoder reader is disposed on the bearing output support element.

In an implementation of the example strain wave gear, the encoder arrangement is an optical encoder arrangement.

In an implementation of the example strain wave gear, the encoder arrangement is a magnetic encoder arrangement.

In an implementation of the example strain wave gear, the encoder arrangement is an inductive encoder arrangement.

In an implementation of the example strain wave gear, a reading distance of the encoder arrangement is less than 1 mm, for example less than 0.5 mm, for example less than 0.2 mm, such as 0.15 mm.

Since the example strain wave gear permits a more well-defined positioning of the encoder arrangement, the reading distance may be reduced, which is advantageous. The reading distance may be understood as the distance from the encoder track to the encoder reader or encoder reader head.

In an implementation of the example strain wave gear, an encoder track diameter is at least 25 mm, for example at least 40 mm, for example at least 60 mm, for example at least 80 mm, such as at least 100 mm.

The diameter may for example be an inner diameter or an outer diameter of the encoder track. The encoder arrangement according to the example strain wave gear may permit a larger diameter and, generally, having a larger diameter is advantageous, since it may permit an improved rotational resolution of the encoder arrangement.

In an implementation of the example strain wave gear, the bearing output support element is fixed to the flex element and the bearing input support element is fixed to the circular element.

In an implementation of the example strain wave gear, the bearing input support element is fixed to the flex element and the bearing output support element is fixed to the circular element.

In an implementation of the example strain wave gear, the bearing input support element is configured to support a bearing input race.

In an implementation of the example strain wave gear, the bearing output support element is configured to support a bearing output race.

In an implementation of the example strain wave gear, the bearing input support element includes a bearing input race.

In an implementation of the example strain wave gear, the outer hearing support element includes a bearing output race.

In an implementation of the example strain wave gear, the bearing input support element and the bearing output support element are configured to support an internal bearing.

The bearing input and output support elements may typically either include races for an internal bearing, or support races for an internal bearing. The internal bearing may rotatably couple the bearing input support element and the bearing output support element and may thus support the relative rotation between the circular element and the flex element, thus supporting the transmission of rotation of the strain wave gear.

In an implementation of the example strain wave gear, the internal bearing is a cross-roller bearing.

A cross-roller bearing may also be understood as a crossed roller bearing. In such a bearing, the rolling elements of the bearing may typically be cylindrical, with the rotational axes of the rolling elements alternating between different directions. The rolling elements may be separated from each other by spacer retainers.

A cross-roller bearing can handle complex loads from any direction, which is advantageous.

In an alternative implementation, the internal bearing is a ball bearing. Generally, any bearings of implementations of the example strain wave gear may be any type of bearing, such as ball bearing, cross-roller bearing, cylindrical roller bearing, spherical roller bearing, gear bearing etc.

In an implementation of the example strain wave gear, a material of the support elements is different from a material of the gear elements.

In an implementation of the example strain wave gear, a hardness of the support elements is different from a hardness of the gear elements.

By having gear elements and support elements, e.g., bearing input and output support elements, in different materials, it may be, for example, possible to optimize the support elements for supporting a bearing, while simultaneously optimizing the gear elements for facilitating torque transmission, which is advantageous. For example, a support element has a first material and a gear element has a second material, where the first and second material are different materials. Similarly, a support element may have a first hardness and the gear element may have a second hardness, where the first and second hardness are different. Materials may for example be two steel alloys, each with a different hardness.

Fastening a part of the encoder arrangement between elements with of different materials may be particularly advantageous, since these elements may then already be manufactured as separate elements. Thus, minimal additional effort may be required for implementing the example strain wave gear, which is advantageous.

In an implementation of the example strain wave gear, an element of the support elements and an element of the gear elements are mechanically fixed to each other by a fastener or fastening means to fasten a part of the encoder arrangement.

For example, the encoder track may be fastened between the circular element and the bearing output support element, and these two elements are mechanically fixed to each other by fastening means, thus fastening the encoder track.

In an implementation of the example strain wave gear, a part of the encoder arrangement is strained between an element of the support elements and an element of the gear elements by a force of at least 1 Newton, for example at least 3 Newton, for example at least 10 Newton, for example at least 25 Newton, such as 40 Newton.

By having an element of the support elements and an element of the gear elements apply pressure to a part of the encoder arrangement, e.g., the encoder track, the fastening of this part may be improved, which is advantageous. This pressure/force/stress may for example be applied by screwing an element of the support elements to an element of the gear elements, thus applying pressure to a part of the encoder arrangement located between these elements.

In an implementation of the example strain wave gear, a part of the encoder arrangement is strained between an element of the support elements and an element of the gear elements by a force of less than 1000 Newton, for example less than 300 Newton, for example less than 100 Newton, such as 60 Newton.

By limiting the strain of a part of the encoder arrangement, undesired deformation and damage may be avoided, which is advantageous.

A force may for example be measured by a force meter/gauge configured to measure the force between the relevant support element and the relevant gear element.

In an implementation of the example strain wave gear, the strain wave gear includes an output flange.

An output flange may facilitate the mechanical output of the strain wave gear. Having a distinct output flange may facilitate improve flexibility, which is advantageous.

In an implementation of the example strain wave gear, the output flange is manufactured as a separate element.

In an implementation of the example strain wave gear, the output flange is an element of the support elements, where a part of the encoder arrangement is fastened between the output flange and an element of the gear elements.

The output flange may thus, for example, fasten the encoder track, or it may fasten the encoder reader.

In an implementation of the example strain wave gear, the output flange and the circular element is manufactured as a single part.

In an implementation of the example strain wave gear, the output flange and the flex element are manufactured as a single part.

In an implementation of the example strain wave gear, the output flange and the bearing output support element is manufactured as a single part.

Manufacturing the output flange and another element as a single part simplifies assembly of the strain wave gear, which is advantageous. Further, it may ensure that the central axis of the strain wave gear is transferred precisely and accurately to the output of the strain wave gear, which is advantageous.

In an implementation of the example strain wave gear, the output flange is an outwardly protruding output flange.

The outwardly protruding output flange makes it possible to increase the diameter of the contact surface whereby a better and more reliable and stable contact may be obtained between the strain wave gear and the object to be driven by the strain wave gear, which is advantageous.

For example, in one implementation, the output flange is an outwardly protruding output flange which can be provided as one of the outwardly protruding output flanges of the strain wave gear disclosed by WO2019/096923 incorporated herein by reference.

Further the outwardly protruding output flange can be provided with mechanical elements ensuring a better connection between the strain wave gear and the connected object, such as connecting teeth, connecting flanges, indicating elements (e.g. matching surface structures) ensuring correct orientation of the connected object in relation to the strain wave gear.

For instance, in one implementation the outwardly protruding output flange can be provided as one of the component flanges of the releasable joint assembly disclosed by WO 2018/130447 incorporated herein by reference.

In an implementation of the example strain wave gear, the strain wave gear includes an input flange.

An input flange may facilitate the mechanical output of the strain wave gear. Having a distinct input flange may facilitate improve flexibility, which is advantageous.

In an implementation of the example strain wave gear, the input flange is an element of the support elements, where a part of the encoder arrangement is fastened between the input flange and an element of the gear elements.

In an implementation of the example strain wave gear, the strain wave gear includes an internal enclosure having lubrication for movable parts such as the internal bearing and the externally toothed gear partly meshed with the internally toothed gear.

In an implementation of the example strain wave gear, the strain wave gear includes a gasket for isolating lubrication in the internal enclosure.

In an implementation of the example strain wave gear, the encoder arrangement is located within the internal enclosure.

In an implementation of the example strain wave gear, the encoder arrangement is located outside the internal enclosure.

If the encoder arrangement is located within the internal enclosure, wiring may be transferred through a gasket. Implementations of the example strain wave gear may have more than one gasket.

Lubrication may for example be grease or oil.

Electronics can be coated with a suitable coating to make sure they do not release any chemical agents to the grease/oil inside the gear. The encoder reading principle can be selected specially for use where grease/oil can be present e.g., magnetic vs optical.

In an implementation of the example strain wave gear, the strain wave gear is integrated in a robot joint for a robot arm, where the robot joint includes a joint motor arranged in a robot joint housing, where the robot joint motor has a motor axle configured to rotate the wave generator.

The robot joint may for example be connectable to another robot joint via an output flange.

In an implementation of the example strain wave gear, the robot joint is installed in a robot arm including a plurality of robot joints mechanically connecting a robot base to a robot tool flange, where at least one robot joint of the plurality of robot joints is the robot joint.

In an implementation of the example strain wave gear, the robot arm is a part of a robot system that includes a robot controller configured to control movement of the plurality of robot joints and thereby movement of the robot tool flange.

An example system relates to a robot system that includes a robot arm and a robot controller, where the robot arm includes a plurality of robot joints mechanically connecting a robot base to a robot tool flange, where the robot controller is configured to control movement of the plurality of robot joints and thereby movement of the robot tool flange, and where at least one robot joint of the plurality of robot joints includes a strain wave gear. The strain wave gear includes, for example:

gear elements, where the gear elements include a circular element with an internally toothed gear and where the gear elements include a flex element with a flexible externally toothed gear arranged in the circular element;

a wave generator rotatably arranged in the flex element configured to flex the externally toothed gear in a radial direction to partly mesh the internally toothed gear and the externally toothed gear;

support elements, where the support elements include a bearing input support element and a bearing output support element rotatably coupled to the bearing input support element, where elements of the support elements are fixed respectively to elements of the gear elements; and an encoder arrangement including an encoder track and an encoder reader, where a part of the encoder arrangement is fastened between an element of the support elements and an element of the gear elements.

An example robot joint and a robot arm including an example strain wave gear of the type described herein may have any of the same advantages the example strain wave gear described herein. The strain wave gear is in principle not restricted to any particular use, but may be particularly well-suited for high-precision tasks as required by robot arm operations, since a more-well defined positioning of the encoder arrangement may increase accuracy and/or precision of robot arm operations, which is advantageous. Further the manufacturing costs of a robot joint and a robot arm can be reduced by providing the robot joint and robot arm with the strain wave gear as the robot joint and robot arm can, in some examples, be assembled much easier and faster.

In an implementation, the strain wave gear used in an example robot system is a strain wave gear as described herein or variants thereof.

Also described herein is a method for assembling a strain wave gear. The method includes:

arranging a flexible externally toothed gear of a flex element in a circular element with an internally toothed gear, where the flex element and the circular element constitute gear elements;

providing an encoder arrangement including an encoder track and an encoder reader; and fixing separate support elements to respective elements of the gear elements to fasten a part of the encoder arrangement between an element of the support elements and an element of the gear elements, where the support elements include a bearing input support element and a bearing output support element.

Also described herein is a method for assembling a strain wave gear. The method includes:

arranging a flexible externally toothed gear of a flex element in a circular element with an internally toothed gear, where the flex element and the circular element constitute gear elements;

providing support elements, where the support elements include a bearing input support element and a bearing output support element; and providing a part of an encoder arrangement between an element of the support elements and an element on the gear elements by fixing separate elements of the support elements to respective elements of the gear elements, where the encoder arrangement includes an encoder track and an encoder reader.

The methods for assembling a strain wave gear may have any of the same advantages as a strain wave gear described herein since they enable manufacture of such strain wave gears. Particularly, the assembling procedure may be simplified since separate means for attaching a part of the encoder arrangement may not be required, which is advantageous.

In an implementation of an example method, providing a part of the encoder arrangement includes arranging the part of the encoder arrangement at an element of the support elements prior to fixing separate elements of the support elements to respective elements of the gear elements.

In an implementation of an example method, providing a part of the encoder arrangement includes arranging the part of the encoder arrangement at an element of the gear elements prior to fixing separate elements of the support elements to respective elements of the gear elements.

In an implementation of an example method, the strain wave gear is a strain wave gear as described herein or a variant thereof In an implementation of an example method, the method further includes inserting a wave generator into the flex element in a radial direction to partly flex the internally toothed gear and the externally toothed gear.

In an implementation of an example method, fixing the separate support elements to respective elements of the gear elements includes attaching an element of the support elements to an element of the gear elements by use of a fastener or fastening means to fasten a part of the encoder arrangement.

In an implementation of an example method, the support elements include an output flange, where a part of the encoder arrangement is fastened by attaching the output flange to an element of the gear elements.

Also descried herein is use of a support element and a gear element to fasten a part of an encoder arrangement in a strain wave gear of the type described herein.

The use of a support element and a gear element to fasten a part of an encoder arrangement in a strain wave gear, may have any of the advantages of a strain wave gear described herein. A support element used for fastening may for example be a support element of a strain wave gear as described herein. A gear element used for fastening may for example be a gear element of a strain wave gear as described herein. An encoder arrangement, of which a part is being fastened, may for example be an encoder arrangement of a strain wave gear as described herein. A support element and a gear element may thus be used to fasten an encoder reader. A support element and a gear element may be used to fasten an encoder track.

In an implementation, the strain wave gear in which a support element and a gear element is used to fasten a part of an encoder arrangement is a strain wave gear of the type described herein or variants thereof.

BRIEF DESCRIPTION OF THE DRAWINGS

Like reference numerals indicate like elements

DETAILED DESCRIPTION

Figure 1:
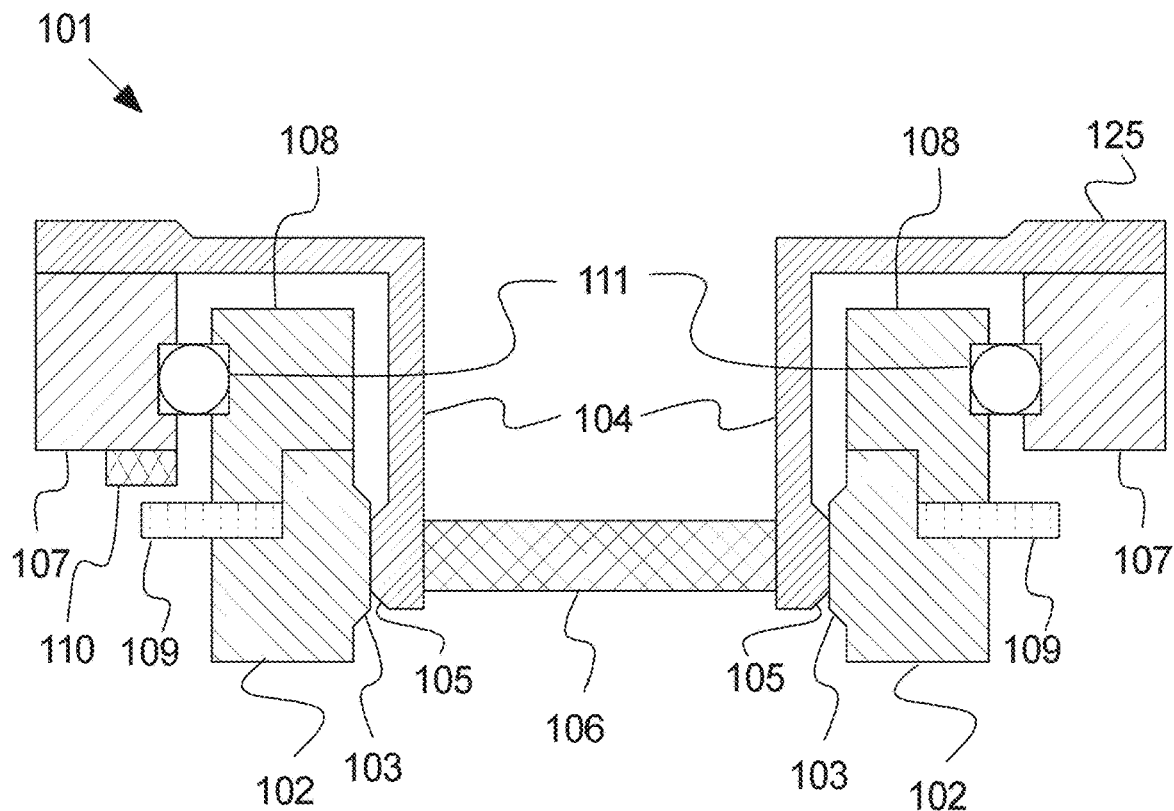
FIG. 1 illustrates a simplified cross-sectional view of components of an example strain wave gear.

FIG. 1 illustrates a simplified cross-sectional view of an implementation of an example strain wave gear. The strain wave gear 101 includes gear elements 102, 104, a wave generator 106, support elements 107, 108, and an encoder arrangement 109, 110.

The strain wave gear 101 is approximately rotationally symmetrical around a central axis of the strain wave gear 101. However, some parts of the gear, such as the encoder reader 110, may not extend all the way around a central axis, but may instead only be localized in one side of the strain wave gear. Further, a wave generator 106 in a strain wave gear 101 is typically not perfectly circular symmetrical, it may for example be elliptical.

The gear elements include a circular element 102 with an internally toothed gear 103 and a flex element 104 with a flexible externally toothed gear 105. The flex element 104 is arranged partly within the circular element 102. The circular element may typically have an annular shaped body. The inner walls of the flex element 104 are formed as a relatively thin hollow cylinder, resulting in significant flexibility. The externally toothed gear 104 is located at the bottom of the inner walls of the flex element 104. The flex element further includes an annular diaphragm which connects the inner walls with an annular boss 125 located at its outer perimeter.

The wave generator 106 is arranged within the flex element 104 to flex it. That is, the wave generator 106 deforms the shape of the flex element 104. The wave generator 106 may for example have an elliptical shape, which it then transfers onto a part of the flex element 104, namely the part at which the externally toothed gear 105 is located. This flexing or deformation of the flex element 104 partly meshes the externally toothed gear 105 of the flex element 104 with the internally toothed gear 103 of the circular element 102. The rotational orientation of the wave generator 106 is not fixed to the rotational orientation of the flex element 104. For example, when the wave generator 106 is rotated, the flex element 104 is does not rotate with the same angular velocity. Instead, upon rotation of the wave generator 106, the position at which the gears 103, 105 are meshed rotates in a circumferential direction, which in turn causes a relative rotation between the circular element 102 and the flex element 104. The flex element 104 has slightly fewer gear teeth than the circular element 102, which in turn may determine the reduction ratio of the strain wave gear.

The support elements 107, 108 include a bearing input support element 107 and a bearing output support element 108. These two are rotationally coupled through an internal bearing 111. Further, the bearing input support element 107 is fixed to the flex element 104, and the bearing output support element 108 is fixed to the circular element 102. Thus, the bearing input and output support elements 107, 108 support the relative rotation between the circular element 102 and the flex element 104. Other implementations of the strain wave gear may have additional support elements. The bearing input support element 107 is connected to the flex element 104 via the annular boss 125 of the flex element 104. They may for example be connected via fasteners such as screws, rivets, nails, click/snap mechanisms, adhesive, welding, etc.

In this implementation, the bearing input and output support elements 107, 108 each support a distinct race for the internal bearing 111. In other implementation, these support elements 107, 108 may be manufactured with integrated races, e.g., for an internal hearing 111. In other implementations, more than one internal bearing may be provided.

Typically, when the strain wave gear 101 is installed, the bearing input support element 107 is fixed to a motor configured to rotate the wave generator 106 through an axle of the motor. The bearing output support element 108 may then be mechanically coupled or fixed to an output, e.g., to rotate a tool or rotate a connection to a neighboring robot joint. The rotation of the motor axle may then be transferred via the strain wave gear 101 with a high torque capability, coaxial input and output, high gear reduction, and minimal backlash.

The encoder arrangement 109, 110 includes an encoder reader 110 and an encoder track 109. In this implementation, the encoder arrangement is a magnetic encoder arrangement. For example, the encoder track 109 has an alternating magnetic pattern encoded in one or more ring-shaped patterns at its perimeter. The encoder reader 110 is able to measure/read this pattern to determine an absolute or incremental measure of the relative orientation between encoder reader 110 and encoder track 109. It is to be understood that the encoder reader and encoder track alternatively or additionally can be provided as optical or inductive encoders.

In this particular implementation, the encoder track 109 is fastened between the circular element 102 and the bearing output support element 108. The encoder reader 110 is attached to the bearing input support element 107. Relative rotation between the bearing input support element 107 and the bearing output support element 108 (and similarly, between the flex element 104 and the circular element 102) will thus result in relative rotation between the encoder reader 110 and the encoder track 109 as well. Consequently, the encoder arrangement 109,110 is able to track the relative rotation.

In this implementation, the bearing output support element 108 has an internal thread (not shown) and the circular element 102 has a matching external thread (not shown). The bearing output support element 108 and the circular element 102 are assembled by screwing these two parts together via their matching threads. Prior to assembling these parts, the encoder track 109 is placed between the two parts, such that assembling the bearing output support element 108 and the circular element 102 results in fastening of the encoder track 109. In this implementation, the encoder reader 110 is attached by screws (not shown) clamping the encoder reader 110 to the bearing input support element 107.

When the strain wave gear is installed in an application, the encoder reader may output its reading via a communicative coupling to a controller, such as a robot controller. The communicative coupling is typically wired such that no power source is required for the encoder reader, but it may alternatively be wirelessly connected. The controller may control the input (and consequently the output) of the strain wave gear 101 based on the measurements from the encoder arrangement 109,110.

Figure 2:
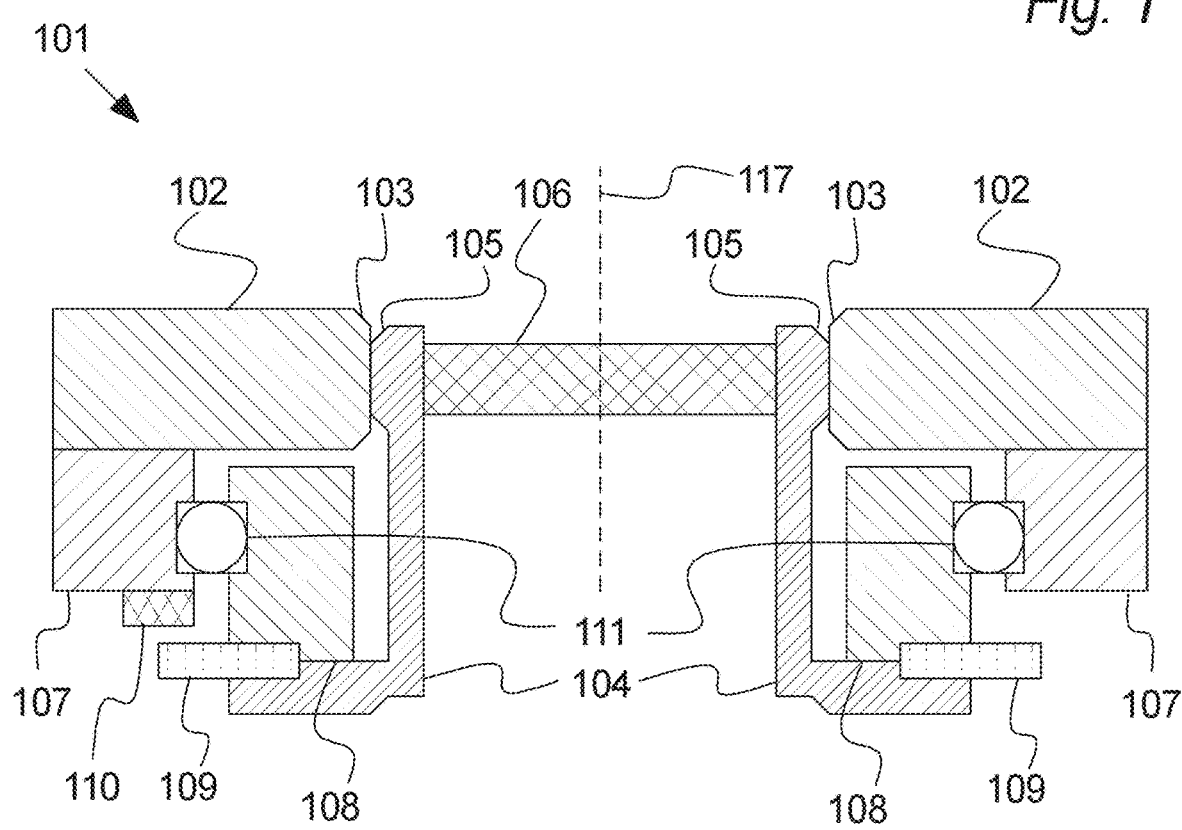
FIG. 2 illustrates a simplified cross-sectional view of components of another example strain wave gear.

FIG. 2 illustrates a simplified cross-sectional view of another implementation of the strain wave gear. In this illustration, a central axis 117 of the strain wave gear 101 is indicated. The input and output of the strain wave gear rotate coaxially around this central axis 117.

Several of the concepts of strain wave gears introduced above apply to the strain wave gear 101 illustrated in FIG. 2, but the individual parts are connected in a different manner.

In this implementation, the bearing input support element 107 is fixed to the circular element 102, while the bearing output support element 108 is fixed to the flex element 104. The encoder track 109 is fastened between the bearing output support element 108 and the flex element 104, which may be connected by glue, screws, welding, or other fastening means. The encoder reader 110 is attached to the bearing input support element 107.

In contrast to the implementation illustrated in FIG. 1, the gear elements 102, 104 are thus connected differently to the support elements 107, 108, but nevertheless, a part of the encoder arrangement 109, 110 is still fastened between an element of the support elements 107, 108 and an element of the gear elements 102,104.

Figure 3:
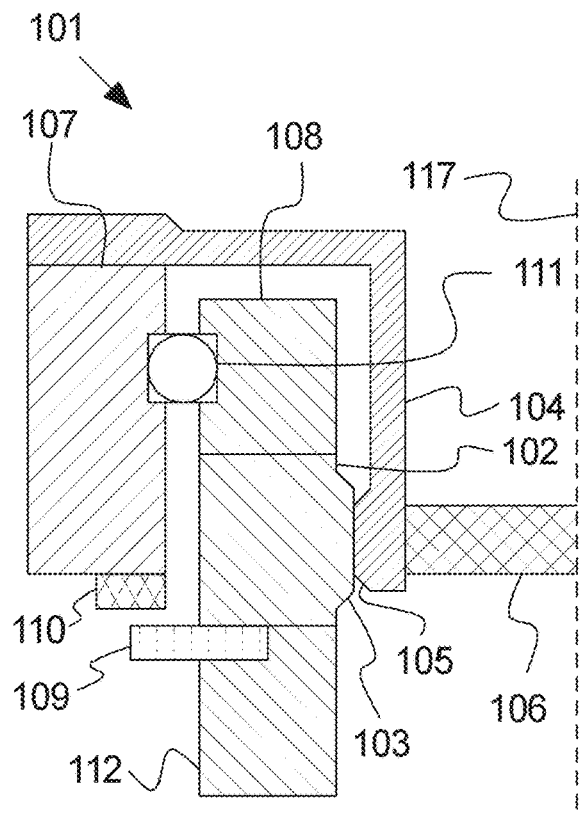
FIGS. 3-5 illustrate simplified cross-sectional views of components of other example strain wave gears.

FIG. 3 illustrates a simplified cross-sectional view of a part of another implementation of the strain wave gear. In this particular illustration, the part of the strain wave gear 101 to the righthand side of the central axis 117 has been omitted.

Several of the concepts of strain wave gears introduced above apply to the strain wave gear 101 illustrated in FIG. 3, but here, the support elements further include an output flange 112.

The output flange 112 facilities the rotational output of the strain wave gear 101. For example, a tool may be connected to the output flange 112, or the output flange may be connected to a neighbouring robot joint in a robot arm.

The encoder track 109 is fastened between the output flange 112 and an element of the gear elements 102, 104, namely the circular element 102. In other implementations, the encoder track may be fastened between the output flange and the flex element. In other implementations, the encoder reader may be fastened between an output flange and the circular element, or between an output flange and the flex element.

Figure 4:
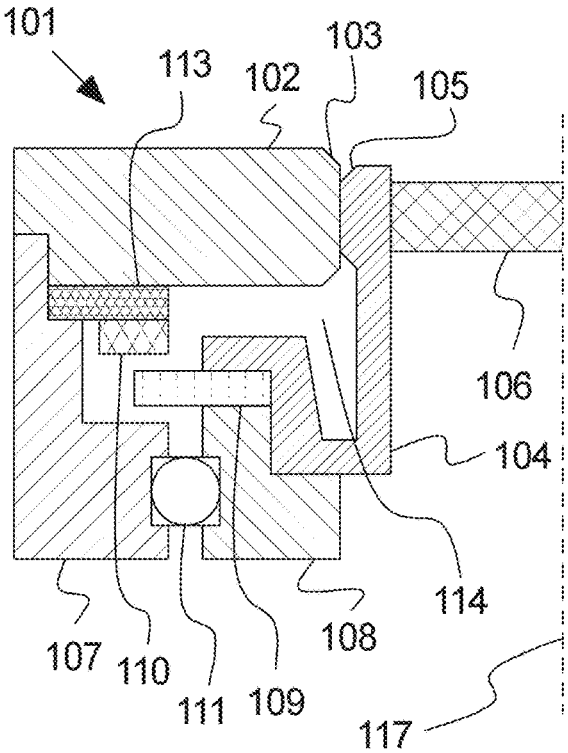

FIG. 4 illustrates a simplified cross-sectional view of a part of another implementation of the strain wave gear. In this particular illustration, the part of the strain wave gear 101 to the righthand side of the central axis 117 has been omitted.

Several of the concepts of strain wave gears introduced above apply to the strain wave gear 101 illustrated in FIG. 4. However, in this implementation, both the encoder reader 110 and the encoder track 109 are fastened between elements of the strain wave gear.

The encoder track 109 is fastened between the flex element 104 and the bearing output support element 108, while the encoder reader 110 is fastened between the circular element 102 and the bearing input support element 107. In other implementations of the strain wave gear, only the encoder reader 110 is fastened between elements.

The encoder reader 110 is fastened via an encoder reader PCB 113. Generally, the encoder reader 110 may include an encoder reader PCB 113 in addition to an encoder reader head, which defines the point at which the measurement of the encoder track 109 is performed. The encoder reader PCB 113 may hold circuitry necessary for driving and measuring with the encoder reader head.

The implementation further illustrates that at least a part of the encoder arrangement can be located in an internal enclosure 114. In this, and in other implementations, an internal enclosure 114 has lubrication for movable parts such as the internal bearing 111 and the externally and internally toothed gears 103,105. The extent of the internal enclosure 114 may typically be confined by one or more gaskets for confining lubrication. Wiring for electronics, e.g., for the encoder reader 110 and its encoder reader PCB 113 may be directed through adequate openings in such gaskets.

Figure 5:
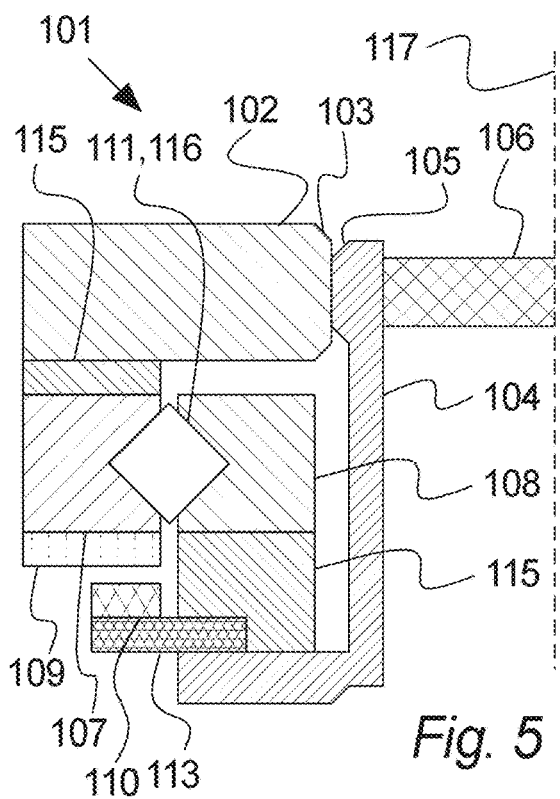

FIG. 5 illustrates a simplified cross-sectional view of a part of another implementation of the strain wave gear. In this particular illustration, the part of the strain wave gear 101 to the righthand side of the central axis 117 has been omitted.

Several of the concepts of strain wave gears introduced above apply to the strain wave gear 101 illustrated in FIG. 5. Moreover, this strain wave gear 101 includes spacer elements 115 and the encoder reader 110 is fixed to the bearing output support element 108.

More specifically, the encoder reader 110 is fastened between the bearing output support element 108 and the flex element 104. However, the encoder reader PCB 113 of the encoder reader is not in direct contact with the output support element 108, but only in direct contact with the flex element 104 and one of the spacer elements 115. Spacer elements 115 may for example be included to ensure proper spacing between other elements of the strain wave gear 101. They may be fastened using any of the fasteners or fastening techniques described in this disclosure.

In this implementation, the bearing output support element 108 and the bearing input support element 107 each include a race for an internal bearing 111 which is a cross-roller bearing 116, which is capable of handling large loads from any direction.

Since the encoder reader 110 is fixed to the output part of the strain wave gear 101, wiring to the encoder reader cannot necessarily be directed to the reader from the input part without restraining the rotational coupling between input and output or implementing a more complex wiring solution. If the strain wave gear is installed in a robot arm, this may for example be solved by connecting the wiring of the encoder reader 110 to a neighbouring robot joint attached to the output of the strain wave gear 101.

Figure 6:
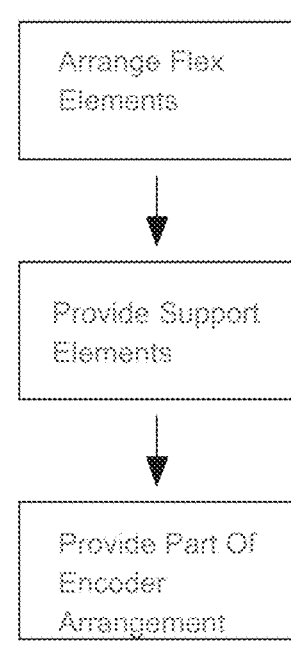
FIG. 6 illustrates a flow chart relating to assembly of an example strain wave gear.

FIG. 6 illustrates an example flow chart relating to assembly of the strain wave gear. Namely, the flow chart relates to a method of assembling a strain wave gear.

In a first operation S1 of the method, a flexible externally toothed gear of a flex element is arranged in a circular element with an internally toothed gear, wherein the flex element and the circular element constitute gear elements.

In a next operation S2 of the method, support elements are provided. The support elements include a bearing input support element and a bearing output support element.

In a next operation S3 of the method, a part of an encoder arrangement is provided between an element of the support elements and an element of the gear elements by fixing separate elements of the support elements to respective elements of the gear elements. The encoder arrangement includes an encoder track and an encoder reader.

The fixing of separate support elements to respective elements of the gear elements may for example be understood as fixing the bearing input support element to the circular element and fixing the bearing output support element to the flex element. Or, it may be understood as fixing the bearing input support element to the flex element and fixing the bearing output support element to the circular element. It may also include fixing an output flange to an element of the gear elements.

Thus, the example method described herein enables assembly of a strain wave gear described herein and variants thereof.

Note that the sequence of operations performed in the method is not restricted to the above example. For example, one or more of the separate support elements can be fixed to respective gear elements prior to arranging the externally toothed gear in the circular element. Furthermore, the method is not restricted to these particular operations but may for example inserting a wave generator.

Figure 7:
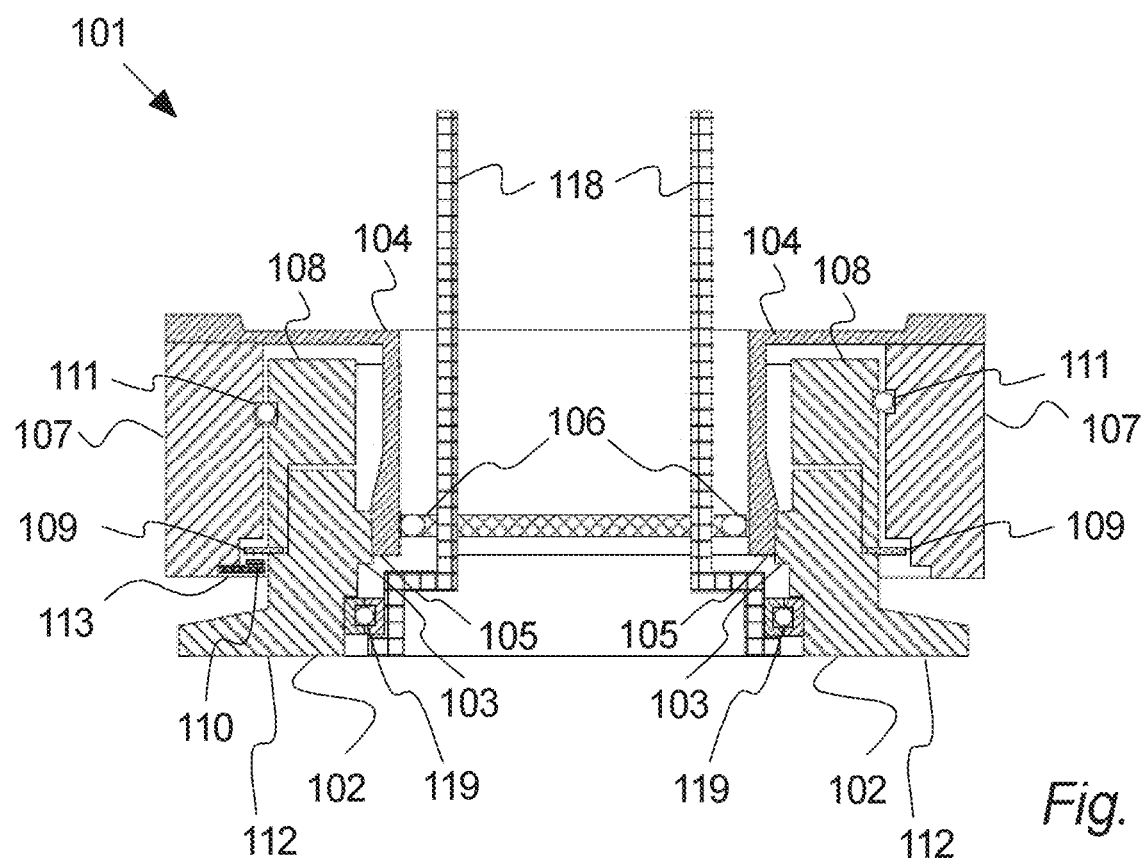
FIGS. 7-9 illustrate simplified cross-sectional views of components of example strain wave gears.

FIG. 7 illustrates a simplified cross-sectional view of another implementation of the strain wave gear.

Several of the concepts of strain wave gears introduced above apply to the strain wave gear 101 illustrated in FIG. 7, but here some optional details are exemplified.

An input shaft 118 is configured to rotate the wave generator 106 in relation to the flex spline. In such implementations with an input shaft 118, the wave generator 106 can for instance be provided as an elliptical rigid cam, as an elliptical wave bearing. The input shaft can for instance be driven by a motor whereby the strain wave gear forms a transmission system between the motor and output side of the strain wave gear.

Further, this implementation has an output flange 112, which is manufactured/fabricated as a single part together with the circular element 102. Furthermore, the output flange 112 is an outwardly protruding output flange. It extends outwardly relatively to the circular element 102 and the bearing output support element 108. It extends radially outward to radially overlap at least partly with the bearing input support element 107.

Additionally, in this and other implementations, a support element serves as a housing of the strain wave gear 101. In this concrete implementation, the bearing input support element 107 serves as housing.

Figure 8:
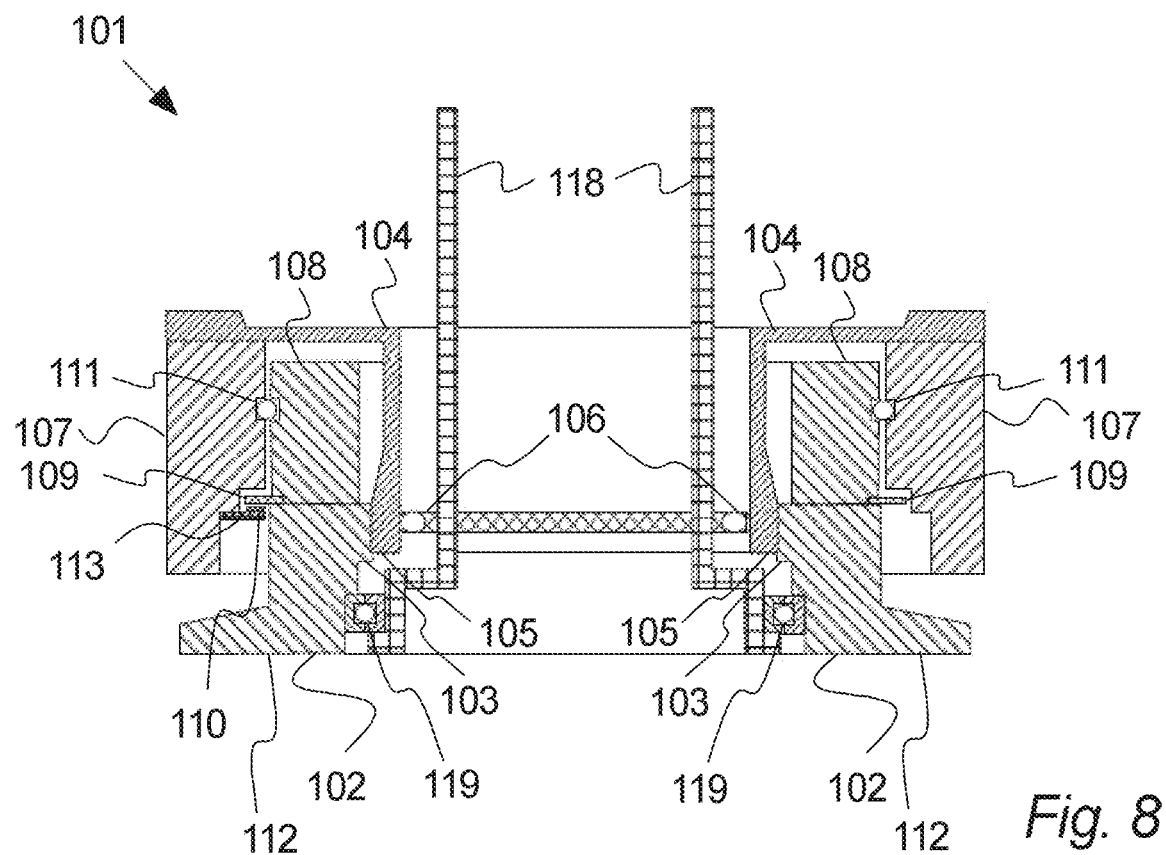
Figure 9:
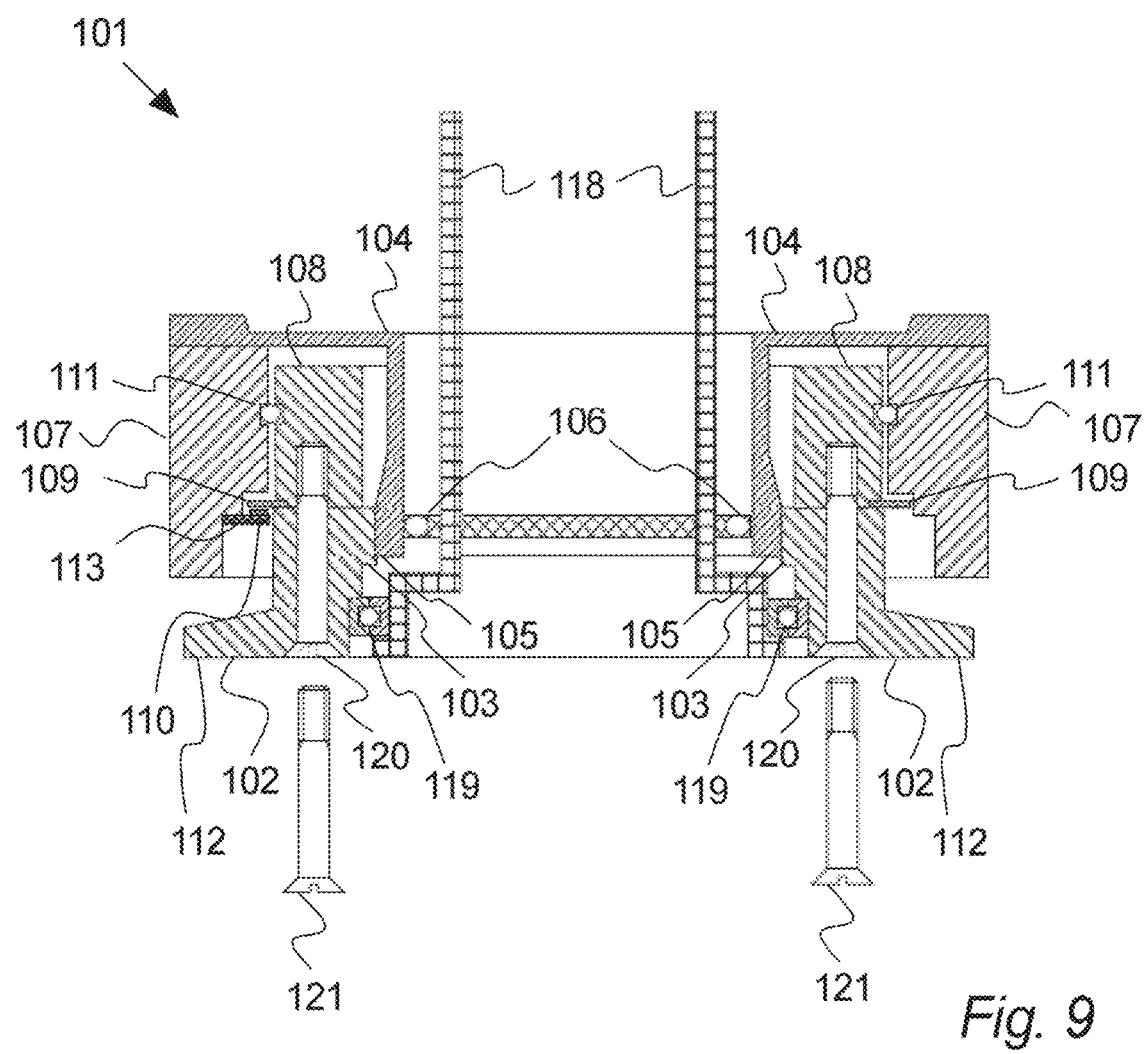

FIG. 8 and FIG. 9 illustrate simplified cross-sectional views of other implementations of the strain wave gear.

Several of the concepts of strain wave gears introduced above apply to these implementations as well. In comparison with the implementation illustrated in FIG. 7, these implementations have other techniques for fastening the circular element 102 to the bearing output support element 108. In FIG. 7, these elements are fastened to each other via an external thread on the circular element 102 and a matching internal thread on the bearing output support element 108. In FIG. 8, the circular element 102 is fastened to the bearing output support element 108 by welding. In FIG. 9, the circular element 102 is fastened to the circular element 102 using screws 121. Accordingly, the circular element 102 and the bearing output support element 108 include matching screw holes 120 with internal threads. By insertion of the screws 121 into the screw holes 120, the encoder track is fastened between the circular element 102 and the bearing output support element 108. With such fastening techniques it is further possible to regulate the strain of the encoder track, for example, by screwing the screws 121 more or less tightly into the screw holes 120.

Figure 10:
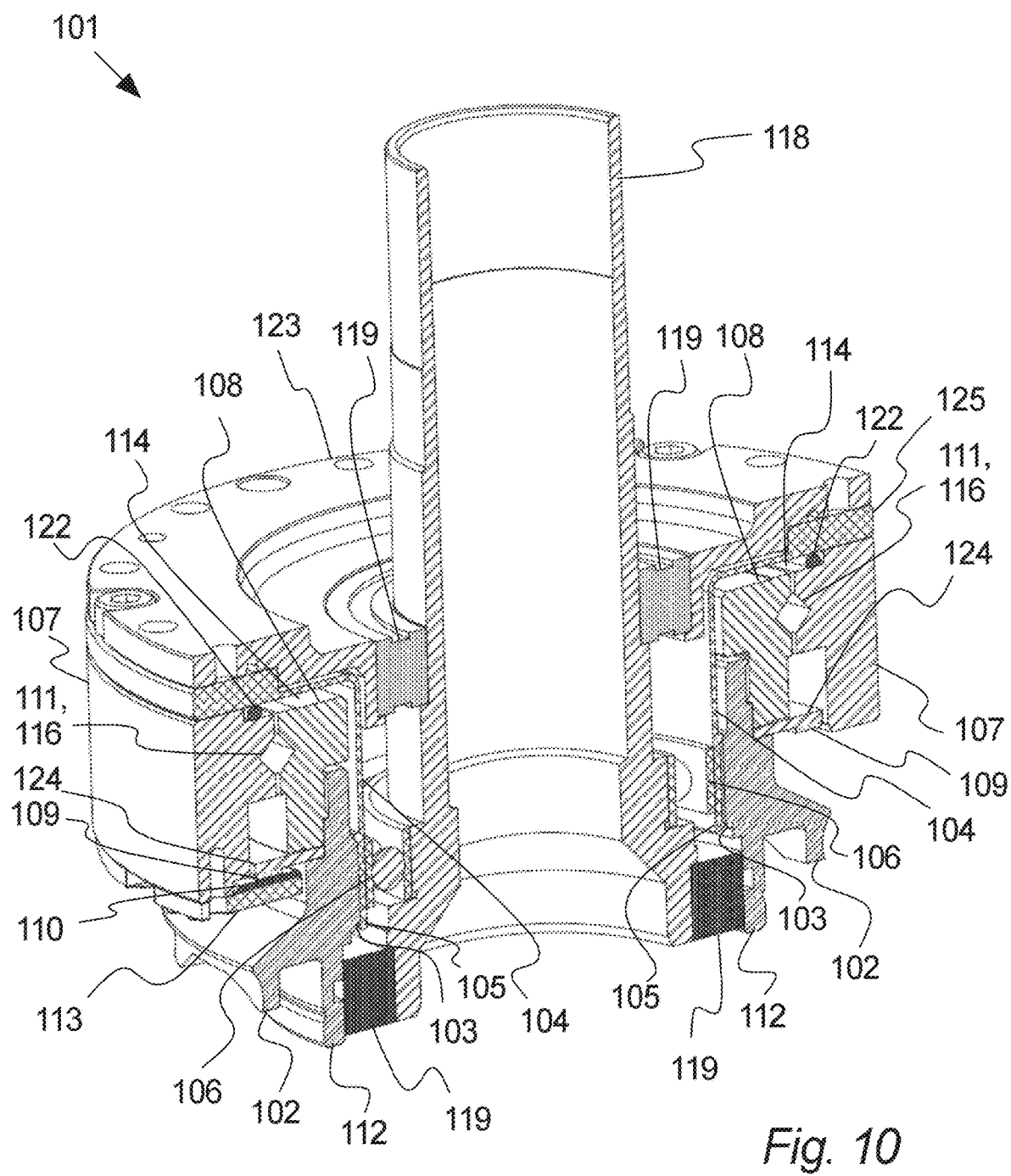
FIG. 10 illustrates a simplified perspective cutaway view of an example strain wave gear.

FIG. 10 illustrates a simplified perspective cutaway view of an implementation of an example strain wave gear having components of the type described herein. Several of the concepts of strain wave gears introduced above apply to this implementation as well.

The bearing input support element 107 and the bearing output support element 108 are each formed as an annular shaped body and are rotatably coupled through an internal bearing 111 which is a cross-roller bearing 116. The races of the bearing 111 is integrally formed in the two support elements 107, 108. The bearing output support element 108 is fixed to a circular element 102 and the bearing input support element 107 is fixed to a flex element 104. The flex element 104 includes an externally toothed gear 105 which and is arranged within the circular element 102 which includes an internally toothed gear 103. The flex element 104 is deformed by a wave generator 106, which in turn can be rotated by an input shaft. This deformation partially intermeshes the externally toothed gear 105 with the internally toothed gear 103. The input shaft 118 is configured to rotate the wave generator 106 in relation to the flex element 104 and the wave generator 106 is upon rotation configured to flex the flexible cylindrical body of the flex element in a radial direction to move the positions at which the external toothed gear 105 partially mesh with the internally toothed gear 103. In the illustrated implementation, the wave generator 106 is an elliptical wave generator as known in the art of strain wave gears. The number of teeth of the internal toothed gear and the external toothed gear are different and rotation of the wave generator moves meshing positions of the gears in a circumferential direction causing the inner ring to rotate in relation to the outer ring. The input shaft 118 can for instance be driven by a motor whereby the strain wave gear forms a transmission system between the motor and output side of the strain wave gear.

The input shaft 118 is hollow which allows wires to be lead through to neighbouring robot joints or other electronics when installed in a robot arm.

A part of the circular element 102 extends out of the bearing input support element 107 and includes an outwardly protruding output flange 112. The output flange 112 extends outwardly in relation to the circular element 102 and towards the outer ring.

The input shaft 118 extends through the flex element 104 and is rotatable supported by the circular element 102 via n shaft bearing 119. The circular element 102 and the input shaft 118 each includes flanges configured to support the bearing 119. This ensures that the input shaft 1111 is arranged, at the correct position inside the strain wave gear.

The encoder arrangement includes an encoder arrangement flange 124 upon which the encoder track 109 is attached. This encoder arrangement flange 124 is fastened between the circular element 102 and the bearing output support element 108. The encoder arrangement further includes an encoder reader 110, which in turn includes an encoder reader PCB 113. The encoder reader PCB 113 has screw holes allowing attachment to the bearing input support element 107 via screws.

The strain wave gear 101 further includes an end plate 123 arranged at the input side of the strain wave gear 101 above an annular boss 125 of the flex element. The end plate 123 includes an opening allowing the input shaft 118 to pass through it. The input shaft is rotatably supported by the end plate via shaft bearings 119. The end plate has screw holes for attachment. Optionally, the flex element 104 may be fixed to the bearing input support element 107 via matching screw holes and screws.

Optionally, a second end plate may be arranged at the output side of the strain wave gear at the end surfaces of the circular element 102 and may include an opening allowing the input shaft 123 and outwardly protruding output flange 112 to pass through the it.

The implementation of the strain wave gear also includes a gasket/seals 122 in the internal enclosure 114. Optionally, implementations of the strain wave gear may include additional gaskets, for example in the opening between the bearing input support element 107, the bearing output support element 108, and the encoder arrangement flange 124. Such gaskets prevent lubrication provided inside the internal bearing 1107 from leaking out. The sealing can be provided as any kind of sealing known from strain wave gears.

Figure 11:
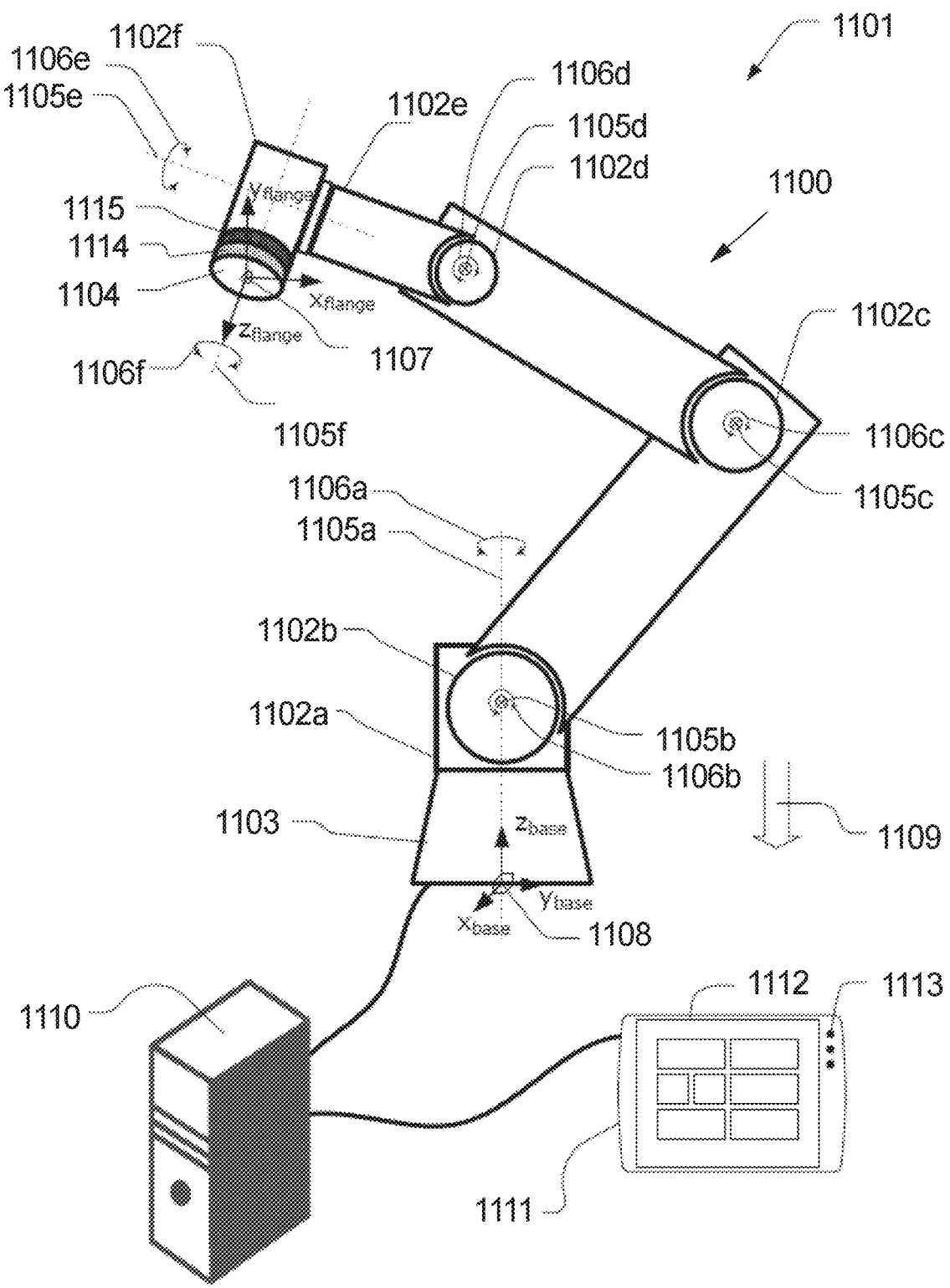
FIG. 11 illustrates an example robot system.

FIG. 11 illustrates an example robot system 1101. The robot system 1101 includes a robot arm 1100 including a plurality of robot joints 1102a, 1102b, 1102c, 1102d, 1102e, 1102f connecting a robot base 1105 and a robot tool flange 1104. One or more of these joints may include a strain wave gear of the type described herein. A base joint 1102a is configured to rotate the robot arm around a base axis 1105a (illustrated by a dashed dotted line) as illustrated by rotation arrow 1106a; a shoulder joint 1102b is configured to rotate the robot arm around a shoulder axis 1105b (illustrated as a cross indicating the axis) as illustrated by rotation arrow 1106b; an elbow joint 1102c is configured to rotate the robot arm around an elbow axis 1105c (illustrated as a cross indicating the axis) as illustrated by rotation arrow 1106c, a first wrist joint 1102*d* is configured to rotate the robot arm around a first wrist axis 1105*d* (illustrated as a cross indicating the axis) as illustrated by rotation arrow 1106*d* and a second wrist joint 1102*e* is configured to rotate the robot arm around a second wrist axis 1105*e* (illustrated by a dashed dotted line) as illustrated by rotation arrow 1106*e*. Robot joint 1102*f* is a tool joint comprising the robot tool flange 1104, which is rotatable around a tool axis 1105*f* (illustrated by a dashed dotted line) as illustrated by rotation arrow 1106*f*. The illustrated robot arm is thus a six-axis robot arm with six degrees of freedom with six rotational robot joints, however the strain wave gear can be included in robot arms having less or more robot joints and also other types of robot joints such as prismatic robot joints providing a translation of parts of the robot arm for instance a linear translation.

A robot tool flange reference point 1107 also known as a TCP is indicated at the robot tool flange and defines the origin of a tool flange coordinate system defining three coordinate axis $x_{flange}$, $y_{flange}$, $z_{flange}$. In the illustrated implementation the origin of the robot tool flange coordinate system has been arrange on the tool flange axis 1105*f* with one axis ($z_{flange}$) parallel with the tool flange axis and with another axis $x_{flange}$, $y_{flange}$ parallel with the outer surface of the robot tool flange 1104. Further a base reference point 1108 is coincident with the origin of a robot base coordinate system defining three coordinate axis $x_{base}$, $y_{base}$, $z_{base}$. In the illustrated implementation the origin of the robot base coordinate system has been arrange on the base axis 1105*a* with one axis ($z_{base}$) parallel with the base axis 1105*a* axis and with another axis $x_{base}$, $y_{base}$ parallel with at the bottom surface of the robot base. The direction of gravity 1109 in relation to the robot arm is also indicated by an arrow and it is to be understood the at robot arm can be arrange at any position and orientation in relation to gravity only limited by the freedom of operation of the robot joints.

The robot system 1101 includes at least one robot controller 1110 configured to control robot arm 1100 and can be provided as a computer comprising in interface device 1111 enabling a user to control and program the robot arm. The controller 1110 can be provided as an external device as illustrated in FIG. 11 or as a device integrated into the robot arm or as a combination thereof. The interface device can for instance be provided as a teach pendent as known from the field of industrial robots which can communicate with the controller 1110 via wired or wireless communication protocols. The interface device can for instanced include a display 1112 and a number of input devices 1113 such as buttons, sliders, touchpads, joysticks, track balls, gesture recognition devices, keyboards etc. The display may be provided as a touch screen acting both as display and input device. The interface device can also be provided as an external device configured to communicated with the robot controller 1110 for instance as smart phones, tables, PCs, laptops, etc.

The robot tool flange 1104 includes a force-torque sensor 1114 (sometimes referred to simply as force sensor) integrated into the robot tool flange 1104. The force-torque sensor 1114 provides a tool flange force signal indicating a force-torque provided at the robot tool flange. In the illustrated implementation the force-torque sensor is integrated into the robot tool flange and is configured to indicate the forces and torques applied to the robot tool flange in relation to the robot tool flange reference point 1107. The force sensor 1114 provides a force signal indicating a force provided at the tool flange. In the illustrated implementation the force sensor is integrated into the robot tool flange and is configured to indicate the force-torque applied to the robot tool flange in relation to the reference point 1107 and in the tool flange coordinate system. However, the force-torque sensor can indicate the force-torque applied to the robot tool flange in relation to any point which can be linked to the robot tool flange coordinate system. In an implementation the force-torque sensor is provided as a six-axis force-torque sensor configured to indicate the forces along and the torques around three perpendicular axes. The force-torque sensor can for instance be provided as any force-torque sensor capable of indicating the forces and torques in relation to a reference point for instance any of the force-torque sensors disclosed by WO2014/110682A1, U.S. Pat. No. 4,763,531, US2015204742, the contents of which are incorporated herein by reference. However, it is to be understood that the force sensor in relation to the strain wave gear not necessarily need to be capable of sensing the torque applied to the tool sensor. It is noted that the force-torque sensor may be provided as an external device arranged at the robot tool flange or omitted.

An acceleration sensor 1115 is arranged at the robot tool joint 1102*f* and is configured to sense the acceleration of the robot tool joint 1102*f* and/or the acceleration of the robot tool flange 1104. The acceleration sensor 1115 provides an acceleration signal indicating the acceleration of the robot tool joint 1102*f* and/or the acceleration of the robot tool flange 1104. In the illustrated implementation the acceleration sensor is integrated into the robot tool joint and is configured to indicate accelerations of the robot tool joint in the robot tool coordinate system. However, the acceleration sensor can indicate the acceleration of the robot tool joint in relation to any point which can be linked to the robot tool flange coordinate system. The acceleration sensor can be provided as any accelerometer capable of indicating the accelerations of an object. The acceleration sensor can for instance be provided as an IMU (Inertial Measurement Unit) capable of indicating both linear acceleration and rotational accelerations of an object. It is noted that the acceleration sensor may be provided as an external device arranged at the robot tool flange or omitted.

Each of the robot joints includes a robot joint body and an output flange rotatable or translatable in relation to the robot joint body and the output flange is connected to a neighbor robot joint either directly or via an arm section as known in the art. The robot joint includes a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing, Additionally, the robot joint includes at least one joint sensor providing a sensor signal indicative of at least one of the following parameters: an angular and/or linear position of the output flange, an angular and/or linear position of the motor shaft of the joint motor, a motor current of the joint motor or an external force, and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in implementations where a gearing has been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may include a plurality of output flanges rotatable and/or translatable by joint actuators, for instance one of the robot joints may include a first output flange rotating/translating a first part of the robot arm in relation to the robot joint and a second output flange rotating/translating a second part of the robot arm in relation to the robot joint.

The robot controller 1110 is configured to control the motions of the robot arm the robot joints by controlling the motor torque provided to the joint motors based on a dynamic model of the robot arm, the direction of gravity acting 1109 and the joint sensor signal.

One or more of the robot joints 1102a-1102f includes a strain wave gear if the type described herein or variants thereof. Consequently, the robot arm 1100 may potentially be operated more accurately and/or precisely.

Descried herein are example implementations of a strain wave gear, a robot arm with a strain wave gear, a method for assembling a strain wave gear, and use of certain elements to fasten a part of an encoder arrangement in a strain wave gear. By utilizing components of a strain wave gear, it is potentially possible a obtain a more well-defined positioning of parts of the encoder arrangement or of the entire encoder arrangement. Further, it may potentially be possible to reduce undesired wobbling of parts of the encoder arrangement. Further, since standard-components may be utilized, assembly of the strain wave gear may be simplified in comparison with conventional solutions.

The example implementations of a strain wave gear, robot, methods, structures, and components thereof described herein have been described for the purpose of illustration rather than limitation with reference to specific examples of strain wave gears, methods, and systems. Details such as a specific method and system structures have been provided in order to understand implementations described herein; for instance, it is to be understood that the implementations disclosed in the different figures and corresponding description can be combined in any way. Note that detailed descriptions of well-known systems, devices, circuits, and methods have been omitted so as to not obscure the description of the strain wave gear, robot, methods, structures, and components thereof described herein with unnecessary details. It should be understood that the strain wave gear, robot, methods, structures, and components thereof described herein are not limited to the particular examples described above and a person skilled in the art can also implement the strain wave gear, robot, methods, structures, and components thereof described herein in other implementations without these specific details. Particularly, it is clear that the concept of fastening a part of an encoder track between two elements of a strain wave gear can be implemented using many different approaches as exemplified in the above description. As such, the strain wave gear, robot, methods, structures, and components thereof described herein may be designed and altered in a multitude of varieties within the scope of the appended claims.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A strain wave gear comprising:
   gear elements comprising:
      a circular element comprising an internally-toothed gear, and
      a flex element comprising a flexible externally-toothed gear arranged adjacent to the circular element;
   a wave generator rotatably arranged in the flex element and configured to flex the externally-toothed gear in a radial direction to partly mesh the internally-toothed gear and the externally-toothed gear;
   support elements comprising:
      a bearing input support element configured for connection to a motor to drive the wave generator, and
      a bearing output support element rotatably coupled to the bearing input support element, the bearing output support element being configured for connection to drive a device,
      wherein elements of the support elements are coupled to elements of the gear elements; and
   an encoder arrangement comprising:
      an encoder track, and
      an encoder reader;
      wherein the encoder track is connected between the circular element and the bearing output support element; and
   wherein the encoder track is directly connected to both the circular element and the bearing output support element.

2. The strain wave gear of claim 1, wherein the encoder reader is connected to the bearing input support element.

3. The strain wave gear of claim 1, wherein the bearing input support element and the bearing output support element are configured to support an internal bearing.

4. A robot system comprising:
   a robotic arm comprising a plurality of robot joints connecting a robot base to a robot tool flange; and
   a robot controller configured to control movement of the plurality of robot joints and thereby control movement of the robot tool flange, at least one robot joint of the plurality of robot joints comprising the strain wave gear of claim 1.

5. A method of assembling the strain wave gear of claim 1, the method comprising:
   arranging the flexible externally-toothed gear of the flex element within the circular element; and
   arranging the encoder track between the circular element and the bearing output support element.

6. The method of claim 5, further comprising:
   arranging the encoder track prior to connecting another element of the support elements to another element of the gear elements.

7. A strain wave gear comprising:
   gear elements comprising:
      a circular element comprising an internally-toothed gear, and
      a flex element comprising a flexible externally-toothed gear arranged adjacent to the circular element;

a wave generator rotatably arranged in the flex element and configured to flex the externally-toothed gear in a radial direction to partly mesh the internally-toothed gear and the externally-toothed gear;
support elements comprising:
  a bearing input support element configured for connection to a motor to drive the wave generator, and
  a bearing output support element rotatably coupled to the bearing input support element, the bearing output support element being configured for connection to drive a device,
  wherein elements of the support elements are coupled to elements of the gear elements; and
an encoder arrangement comprising:
  an encoder track, and
  an encoder reader;
  wherein the encoder track is connected between the circular element and the bearing output support element; and
wherein the bearing input support element is directly connected to the flex element, and wherein the bearing output support element is directly connected to the circular element.

8. The strain wave gear of claim 7, wherein the encoder reader is directly connected to the bearing input support element.

9. The strain wave gear of claim 8, wherein the bearing input support element is directly connected to the flex element, and wherein the bearing output support element is directly connected to the circular element.

10. The strain wave gear of claim 9, further comprising an output flange.

11. The strain wave gear of claim 10, wherein the output flange is connected to the circular element.

12. A strain wave gear comprising:
gear elements comprising:
  a circular element comprising an internally-toothed gear, and
  a flex element comprising a flexible externally-toothed gear arranged adjacent to the circular element;
a wave generator rotatably arranged in the flex element and configured to flex the externally-toothed gear in a radial direction to partly mesh the internally-toothed gear and the externally-toothed gear;
support elements comprising:
  a bearing input support element configured for connection to a motor to drive the wave generator, and
  a bearing output support element rotatably coupled to the bearing input support element, the bearing output support element being configured for connection to drive a device,
  wherein elements of the support elements are coupled to elements of the gear elements; and
an encoder arrangement comprising:
  an encoder track, and
  an encoder reader;
  wherein the encoder track is connected between the circular element and the bearing output support element; and
wherein the strain wave gear further comprises fastening means to connect the encoder track directly to both the circular element and the bearing output support element.

13. A strain wave gear comprising:
gear elements comprising:
  a circular element comprising an internally-toothed gear, and
  a flex element comprising a flexible externally-toothed gear arranged adjacent to the circular element;
a wave generator rotatably arranged in the flex element and configured to flex the externally-toothed gear in a radial direction to partly mesh the internally-toothed gear and the externally-toothed gear;
support elements comprising:
  a bearing input support element configured for connection to a motor to drive the wave generator, and
  a bearing output support element rotatably coupled to the bearing input support element, the bearing output support element being configured for connection to drive a device,
  wherein elements of the support elements are coupled to elements of the gear elements; and
an encoder arrangement comprising:
  an encoder track, and
  an encoder reader;
  wherein the encoder track is connected between the circular element and the bearing output support element;
wherein the strain wave gear further comprises an output flange; and
wherein the output flange is connected to the encoder track and directly connected to the circular element.

14. The strain wave gear of claim 13, wherein the device comprises one of a tool or a robot joint.

15. The strain wave gear of claim 13, wherein the encoder reader comprises an encoder printed circuit board (PCB).

16. The strain wave gear of claim 13, wherein the bearing input support element is connected to the flex element, and wherein the bearing output support element is connected to the circular element.

17. The strain wave gear of claim 16, wherein the bearing output support element is indirectly connected to the flex element, and wherein the bearing input support element is indirectly connected to the circular element.

18. The strain wave gear of claim 13, wherein the bearing input support element and the bearing output support element are configured to support an internal bearing.

19. A robot system comprising:
a robotic arm comprising a plurality of robot joints connecting a robot base to a robot tool flange; and
a robot controller configured to control movement of the plurality of robot joints and thereby control movement of the robot tool flange, at least one robot joint of the plurality of robot joints comprising the strain wave gear of claim 13.

20. A method of assembling the strain wave gear of claim 13, the method comprising:
arranging the flexible externally-toothed gear of the flex element within the circular element.

21. The method of claim 20, further comprising
arranging the encoder reader prior to connecting another element of the support elements to another element of the gear elements.

* * * * *

UNITED STATES PATENT AND TRADEMARK OFFICE
CERTIFICATE OF CORRECTION

Page 1 of 1

| | |
|---|---|
| PATENT NO. | : 11,796,045 B2 |
| APPLICATION NO. | : 17/553110 |
| DATED | : October 21, 2025 |
| INVENTOR(S) | : Steffen Henrik Johansen |

It is certified that error appears in the above-identified patent and that said Letters Patent is hereby corrected as shown below:

On the Title Page

After Prior Publication Data, please add:
(30) Foreign Application Priority Data
March 25, 2021 (DK) .................. PA 2021 70142

Signed and Sealed this
Twenty-fifth Day of November, 2025

John A. Squires
*Director of the United States Patent and Trademark Office*